May 10, 1955 H. W. KOREN ET AL 2,708,211
ELECTRIC STORAGE BATTERIES AND THEIR PRODUCTION
Filed March 21, 1952 4 Sheets-Sheet 1

INVENTORS
H.W. KOREN
G. BAUMSTARK
BY
Greene, Pineles & Dunn
ATTORNEYS

May 10, 1955 H. W. KOREN ET AL 2,708,211
ELECTRIC STORAGE BATTERIES AND THEIR PRODUCTION
Filed March 21, 1952 4 Sheets-Sheet 3

INVENTORS
H. W. KOREN
G. BAUMSTARK
BY
ATTORNEYS

May 10, 1955   H. W. KOREN ET AL   2,708,211
ELECTRIC STORAGE BATTERIES AND THEIR PRODUCTION
Filed March 21, 1952   4 Sheets-Sheet 4

INVENTORS
H. W. KOREN
G. BAUMSTARK
BY
Greene, Pineles & Dunn
ATTORNEYS

United States Patent Office 2,708,211
Patented May 10, 1955

2,708,211

ELECTRIC STORAGE BATTERIES AND THEIR PRODUCTION

Heiman W. Koren, Bronxville, and George Baumstark, Tarrytown, N. Y., assignors to Sonotone Corporation, Elmsford, N. Y., a corporation of New York Application March 21, 1952, Serial No. 277,841

11 Claims. (Cl. 136—28)

This invention relates to electric storage batteries and their production, and more particularly, to alkaline storage batteries which are known as nickel-cadmium storage batteries. It was long known that for best results such nickel-cadmium batteries should operate with porous electrode plates of sintered nickel powder particles having the pores loaded with the active materials for the positive and negative electrodes, respectively. However, in the past, the processes used in forming sintered activated electrode plates for such nickel-cadmium batteries were unsatisfactory and the resulting plates varied widely in their characteristics, and a great percentage of nickel-cadmium batteries produced with prior art sintered plates became defective in the initial stage of their operation.

Among the objects of the invention are methods by which the sintered electrode plates for such nickel-cadmium batteries may be produced in a way that makes it possible to obtain highly effective sintered electrode plates for such batteries of consistent quality and characteristics on a large scale production basis.

Among the objects of the invention are also superior sintered electrode plates for such batteries which eliminate the difficulties encountered with prior art electrode plates of this type.

It is also among the objects of the invention to provide nickel-cadmium alkaline batteries having a novel electrode spacer which permits the construction of compact batteries of this type having lower internal resistance and higher discharge capacity than prior batteries of this type.

It is also among the objects of the invention disclosed herein to provide a superior multicell battery assembly.

The foregoing and other objects of the invention will be best understood from the following description of exemplifications thereof, reference being had to the accompanying drawings, wherein

Fig. 1–A is a detail side view of the central portion of the top wall;

Fig. 8–A is a view similar to Fig. 8 of a modified construction;

Figs. 11–A, 11–B and 11–C are curve diagrams giving typical operating characteristics of a battery of the invention.

The principles underlying the features of the invention disclosed herein will be explained by reference to one practical form of a battery cell shown in Figs. 1 to 3, and generally designated 10. The battery cell 10 comprises a flat casing having two extended side walls 11 with adjoining two narrow side walls 12 and a bottom wall 13, the casing space being enclosed at the top by a top wall 15. The housing walls 11 to 15 are all made of a suitable alkali-resistant material. Suitable resin materials for this purpose are the nylons, polyethylene terephthalate (Dacron), polyacrylonitrile, polystyrene, polyvinyl chloride and like synthetic resins which are resistant to alkali solutions.

Within the top wall 15 are mounted, and are held fixed and sealed therethrough with a fluid-tight seal, two metallic terminal members 21 of opposite polarity providing terminal connections to the opposite polarity battery plates of the electrode assembly generally designated 30 held within the interior of the casing 11. Each of the two terminal members 21 is made in the form of a metal shank, passing through an opening within the insulating top wall 18 and having on its inner side an enlarged head 22 held seated across a sealing washer 23, of alkali resistant rubber material, such as neoprene, against the overlying seating surface of the top wall bordering the opening thereof. The shank head 22 is held clamped to its seat by a sealing nut 24 threadedly engaging the upper threaded portion of the terminal shank member 21 and clamped against the underlying seating surface of the top wall 18 to form a liquid-tight seal therewith. If desired, an additional rubber-like sealing washer may be interposed between the sealing nut 24 and the underlying seating surface of the top wall 15 of the housing.

The inner head 22 of each terminal member is provided with downwardly extending ear members 26 to which are affixed, as by welding, the upper ends of a superposed opposite polarity array of strip-like electrode leads or tabs 31, 32 of the battery assembly 30. The two terminal members 21 are made of alkali-resistant metal, such as nickel.

The inner faces of the large side walls 11 of the cell casing are provided with short rib projections 11–1 for holding the large side surfaces of the battery assembly 30 slightly spaced, such as by a gap spacing of about .020 to .040 inch, from the inner walls of the casing. Similarly, the inwardly facing side of the bottom casing wall 13 is provided at its opposite narrow end regions with the raised ledge portions 13–1 for holding the bottom edges of the electrode assembly 30 at a small gap spacing, such as .020 to .040 inch, above the surface of the bottom wall 13.

The battery assembly 30 is permeated by and held immersed within a liquid body of an electrolyte shown extending up to a level 41 which is higher than the upper level of the electrode assembly 30. The electrolyte of such nickel-cadmium batteries usually consists of a 20 to 35% (by weight) solution of potassium hydroxide KOH in water. Excellent results are obtained with a 30% solution of potassium hydroxide as the electrolyte. Alternatively, a solution of sodium hydroxide may be used as the electrolyte.

The well known principles of operation of nickel-cadmium batteries having positive electrodes of nickelous hydroxide particles $Ni(OH)_3$ and negative electrodes of cadmium hydroxide particles $Cd(OH)_3$ immersed in an electrolyte consisting of a solution of potassium hydroxide are believed at present to be substantially as follows:

When fully charged, the active positive electrode material consists of nickelic hydroxide and the active negative electrode material consists of cadmium. During the discharge, the active material of the positive electrode tends to reach a lower energy level involving a reduction of its active nickelic hydroxide material to the lower nickelous hydroxide $2Ni(OH)_2$ and the releasing of negatively charged hydroxyl ions while the negative electrode is oxidized to form cadmium hydroxide $Cd(OH)_2$ and/or cadmium oxide and give up electrons to the external circuit. In charging such cell, chemical changes take place at the positive electrode involving oxidation of its nickelous hydroxide material and/or the release of oxygen while the active electrode material of the negative electrode, to wit, the cadmium hydroxide and/or cadmium oxide, undergo a chemical change which involves the reduction of the cadmium hydroxide and/or cadmium oxide to pure cadmium and the release of hydrogen. Accordingly, gas will develop in the cell during the charging process.

One phase of the present invention disclosed herein involves novel methods and processes for the manufacture of sintered active electrode plates for such nickel-cadmium batteries which will be now explained in connection with Figs. 4 to 8.

In accordance with a phase of the invention, the electrode plates for nickel-cadmium batteries are formed by producing them out of large sintered sheet formation of nickel particles loaded and treated to embody in them the proper amount of the respective positive and negative active electrode material, the so-treated and formed large sheet formation being thereafter cut into properly formed electrode plate sections of the required size out of which the electrode assembly of the battery cell is formed.

In general, the process of forming the positive and negative electrode plates out of large sheet formations in accordance with the invention, involves the following series of steps.

1st, a thin grid, reticulated sheet or a layer of gauze of metallic nickel is placed between two layers of fine nickel powder within a suitable refractory carrier or boat and sintered at an elevated temperature so as to form a self-supporting sheet formation of sintered nickel particles having embedded in its interior the thin backing grid or gauze of metallic nickel which provides electro-conductive connections and also strengthens and backs up the sheet formation.

2nd, the large sheet formation produced in the 1st step is then placed in a die arranged to compact therein crosswise extending narrow separation zones wherein the powder particles are compressed to very high density, with the thickness of the zone substantially reduced to the thickness of the metallic backing grid or gauze.

3rd, the large sheet formation of sintered nickel powder having thin compacted subdivision zones is then further sintered or resintered at an elevated temperature in a protective atmosphere for increasing the bond between the metal particles resulting in sheet formations consisting of sheet sections having 80 to about 85% porosity separated by highly compacted narrow separation zones of only 5 to 2% porosity or 95% to 98% density.

4th, depending on the size, one, two, or more processing tabs of nickel sheet material are welded to spaced portions along one edge of each sheet formation which has been previously compacted to substantially the thickness of its backing screen or grid.

5th, an array of such large sheet formation is then loaded with the potentially active material, to wit, a solution of nickel nitrate for the positive electrode sheet formations and a solution of cadmium nitrate for the negative electrode sheet formations.

6th, thereafter, the loaded arrays of sheets for the respective electrodes are activated by placing them in a strong alkali solution of either sodium or potassium hydroxide and subjecting them to a cathodic electrolytic process whereby the nickel nitrate and cadmium nitrate previously deposited or loaded into the pores is converted into the desired active electrode material, to wit, nickel hydroxide and cadmium hydroxide, for the positive and negative electrodes, respectively.

7th, the activated sheet formations are then washed to remove any nitrate deposited therein and also any loose particles deposited or present thereon.

8th, the washed sheet formations are then brushed or otherwise treated while wet, as with a spray, to remove from their surfaces any encrustations of active material and any loose particles present thereon.

Steps 5th to 8th are repeated in sequence a number of times until all sheet formations have been properly loaded with the active electrode materials.

9th, after drying, arrays of so-prepared sheet formations of alternate polarity, with interposed separators, are then placed in a forming bath and given a number of charging cycles each followed by a discharge.

10th, after properly loading, activating and forming, the sheet formations are, after first washing, thickness-sized while wet, as by compacting in a sizing press to bring their active large areas to the desired thickness.

11th, the sheet formations are then stacked flat and flattened under a weight, and the weighted stack is dried.

12th, the large sheet formations are thereafter cut along the compacted thin separation zones and separated into sheet sections, each of the size of the desired battery electrode plate.

13th, the edges of the electrode plate sections so formed by cutting the large sheet formations are then coated with cementitious material, for instance, a plastic or synthetic resin coating material, to bind into position any particles which may have been loosened by the cutting operation and to cover any sharp edges of the backing screen formed or exposed thereon as a result of the cutting operation.

Figure 1:
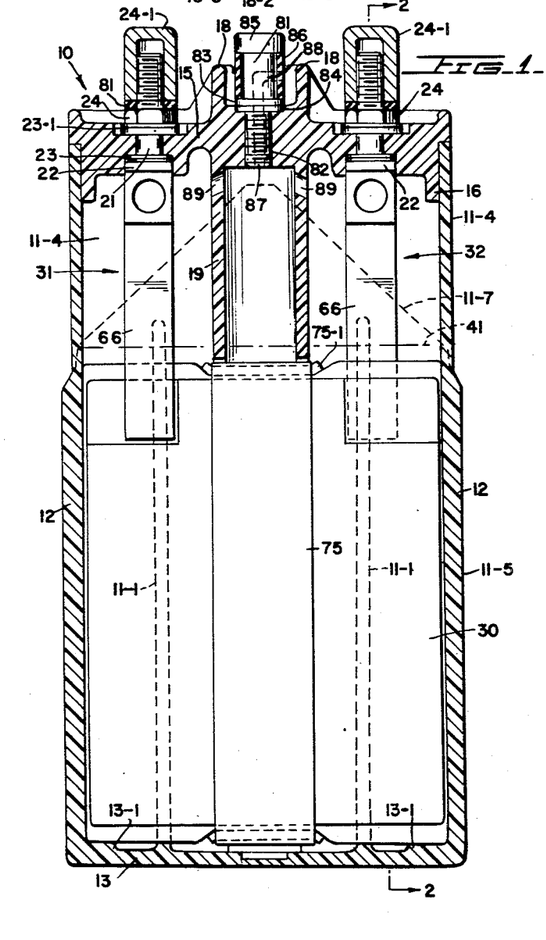
Fig. 1 is a vertical sectional view of an assembled battery cell made in accordance with the invention.

14th, electrode lead tabs are then welded to compacted thin compacted corner portions of the individual electrode plate sections, thereby completing the individual electrode plates, whereupon they are ready for assembly into battery electrode sub-assemblies, such as shown at 30 in Fig. 1.

The individual steps of the process of the invention for forming the opposite polarity plate of a nickel-cadmium battery in accordance with the invention in the manner outlined above will now be described in more detail.

In the 1st step, pure nickel powder is formed into a porous sintered nickel powder sheet formation. Fine nickel powder of —200 mesh prepared by heating nickel carbonyl at an elevated temperature within a protective atmosphere, such as cracked ammonia or purified hydrogen, is suitable for this purpose. It is also desirable to provide an electrically highly conductive backing for the sintered nickel powder sheet formation. A reticulated grid-like thin sheet of nickel or a thin wire screen or gauze of nickel wire is suitable as such backing. Such reticulated or perforated nickel backing sheet may also be formed by an electro-deposition process. Where wire gauze is used, its electrical conductivity may be improved by electro-depositing thereon in bath a thin stratum of nickel. Depending on the thickness of the final electrode plates, metal sheets or wire mesh formed of wire having smaller or greater thickness may be used. Thus, by way of example, very effective electrode plates .025 inch thick, may be produced with a backing sheet of a nickel wire mesh of 20 wires per inch in cross-wise directions, each wire having a thickness of .007 inch, such mesh being conventionally designated 20 x 20 x .007 mesh. Similarly, very effective electrode plates .050 inch thick may be produced with a backing sheet of nickel wire mesh 16 x 16 x .012.

By way of example, for producing sintered electrode plate sheets of the invention having a thickness of .025 inch, a backing gauze of nickel wire 20 x 20 x .007 is placed between two layers of fine nickel powder within a suitable mold of graphite, for instance. The powder formations are then sintered in a furnace at an elevated temperature in the range of 800° to 1000° C. within a protective atmosphere of cracked ammonia for 10 to 15 minutes until the nickel particles are firmly sintered to each other and to the backing sheet and form therewith a self-supporting powder sheet formation of about .025 inch thick with the sintered powder body exhibiting about 75 to 90% porosity. As the nickel powder layer shrinks in sintering, suitable allowance is made in dimensioning the powder layer deposited in the mold preparatory to the sintering operation. Good results are obtained with sintering at 900 to 925° C. for 12 to 10 minutes, yielding sintered nickel powder sheet formations of about 82 to 86% porosity.

Figure 4:
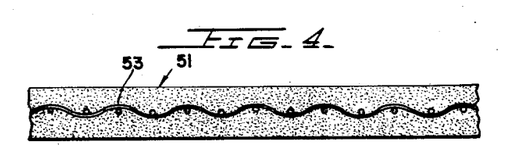
Fig. 4 is a greatly enlarged cross-sectional view of a portion of a large sintered sheet formation representing the first stage in forming battery electrode plates of the invention with parts shown exaggerated.

Fig. 4 is a cross-sectional view of a portion of so-formed sintered nickel powder sheet formation 51 about .025 to .030 inch thick consisting of sintered nickel powder particles in which is embedded a nickel wire mesh gauze 53 wherein the sintered nickel powder body has a porosity of 82 to 86% and is used for forming electrode plates of the invention. The pores or interstices between the sintered nickel powder particles are of microscopic dimensions.

Figure 5:
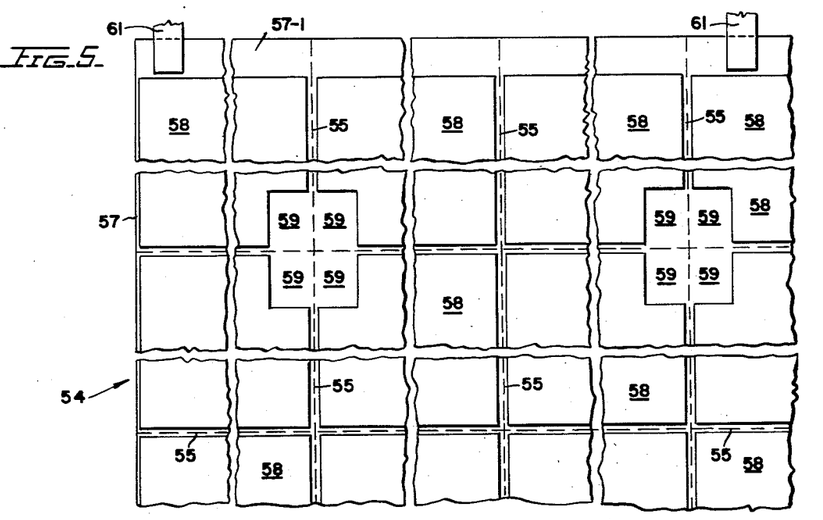
Fig. 5 is a plan view howing a portion of the same large sintered sheet formation in a subsequent forming stage.
Figure 6:
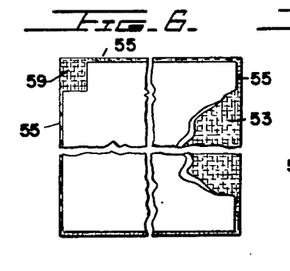
Fig. 6 is a plan view similar to Fig. 5 of an individual battery electrode plate formed by cutting the sheet formation of Fig. 5.
Figure 7:
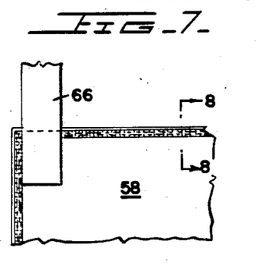
Fig. 7 is a view similar to Fig. 6 of the same electrode plate in a later forming stage with the electrode terminal tab affixed thereto.

In the 2nd step, the sintered nickel sheet formation 51 is subjected to the compacting treatment in which it is placed within a compacting die for forming along the large sheet formation 51 cross-wise extending narrow highly-compacted separation zones along which the sheet formation is subsequently cut into the separate electrode plate sections. Fig. 5 is a plan view showing the general configuration of a sheet formation of Fig. 4 after it is given such compacting treatment. The compacted sheet formation 54 shown in Fig. 5 has cross-wise extending narrow separation zones 55 about 1/16 inch wide, and also narrow edge zones 57, about 1/32 inch wide, which are highly compacted to substantially the thickness of the screen mesh 53 embedded therein. On the other hand, the major area of each section 58 bordered by the thin compacted zones 55 and 57 is not compacted so that it retains the desired porosity and may be formed into the effective electrodes in the manner described hereinafter.

One of the compacted edge zones, such as the upper edge zone 57–1 of the sheet formation (Fig. 5), is made somewhat wider, about ¼ to ½ inch and is used to provide processing connections thereto.

Figure 8:
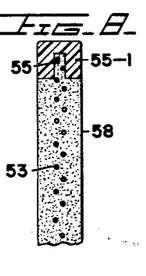
Fig. 8 is a cross-sectional view along line 8—8 of Fig. 7.

The compacting die is so shaped as to form at the corner of each plate section 58 a compacted corner region 59 serving as the electrode junction of each electrode plate section 58. To simplify the compacting operation, the compacting die is so designed as to form the compacted corner terminal regions 59 on four adjoining corners of four adjoining electrode sections 58 of the sheet formation 54, as indicated in Fig. 5. Fig. 8 shows in cross-section and exaggerated for the sake of clarity, the general configuration of the main surface region of each electrode plate section 58 and of the compacted separation zones or edge regions 55 thereof. Depending on the requirements, such compacted terminal region 59 may be formed along another portion of the edge regions of the individual plate section 58, of such sheet formation 54 (Fig. 5).

In the next 3rd step, the compacted sectionalized large sheet formation 54 is subjected to an additional sintering treatment. In this additional sintering treatment, an array of such large compacted sheet formations is maintained at an elevated temperature within a similar oxidizing suppressing protective atmosphere for causing the particles of the sintered sheet to be very firmly and closely bound to each other. It has been found desirable to effect the resintering treatment at a lower temperature and for a shorter period than the original sintering, such as about 650 to 950° C. for about 7 to 2 minutes. In producing plates about .025 to .050 inch thick, good results are obtained by resintering at about 870° C. for about 3 minutes. Such resintering treatment is very effective in securing a tight bond between the wires of the wire gauze 52 with the sintered nickel powder particles along the thin compacted zones 55 and edges 57.

In the next 4th step, processing tabs 61 of nickel sheet material are attached, as by welding, to spaced portions of the somewhat wider compacted edge regions 57–1 of each large sheet formation 54 (Fig. 5) for use in the subsequent treatment steps.

In the next 5th step, the loading treatment, an array of similar sheet formations 54, such as shown in Fig. 5, are placed in a solution of either nickel nitrate or cadmium nitrate, for loading their pores therewith preparatory to the activating treatment in which they are formed either into positive or negative electrode plates, respectively. The porous sheet formation for the positive electrode is impregnated with a solution of nickel nitrate $Ni(NO_3)_2 \cdot 6H_2O$ with a slight excess of nitric acid. The porous sheet formation for the negative plates is impregnated with a solution of cadmium nitrate $Cd(NO_3)_2 \cdot 4H_2O$. A suitable impregnating solution of nickel nitrate is one which is nearly saturated at room temperature of 20 to 30° C. A suitable solution of cadmium nitrate is one which is similarly nearly saturated at such room temperature. Good results are obtained with a nickel nitrate solution having a specific gravity of 1.6 and a cadmium nitrate solution having a specific gravity of 1.8 at room temperature. In this loading treatment, the sintered compacted porous sheet formations 54 are placed in a vessel, and after evacuation of the vessel, the nitrate solution is introduced into the vessel for impregnating and loading the pores of the extended electrode area sections 58 of each sheet formation 54 with the proper nitrate solution.

In the next 6th treatment step, the loaded sheet formations 54 for the positive or negative electrode plates are activated by a cathodic electrolytic process within a heated bath of an alkali solution of either sodium or potassium hydroxide for converting the nickel nitrate and cadmium nitrate loaded into the microscopic pores of the plate sections into the desired active positive or negative electrode material, respectively. In the positive electrode plate sections of the sheet formation 54, the nickel nitrate loaded into its pores is converted by the electrolysis into nickel hydroxide retained within the pores of the plate. In the negative electrode sections of the sheet formation 54 the cadmium nitrate loaded into its pores is converted by the electrolysis into cadmium hydroxide, and some of the hydroxide is reduced into cadmium. The electrolizing bath may be formed of a 15 to 25% solution of either sodium or potassium hydroxide and it is kept near the boiling point. By way of example, good results are obtained with a bath formed of a 20% solution of sodium hydroxide maintained near its boiling point at about 100 to 110° C. For electrode plates .025 to .050 inch in size, the electrolizing current may be about ½ to 3 ampere per square inch of sheet formation, and it may be larger. Good results are obtained by treating such plates with an electrolizing current of 2.5 amperes per square inch of sheet formation.

In the washing treatment, or step 7, each sheet formation which was electrolyzed in the manner described above, is washed in ionized water to remove any sodium or potassium nitrate formed or deposited in the pores or on the surface of the sheet formation. Good results are obtained by washing until the drip water from the washed sheet formation has a pH of 7.0.

The washing treatment is followed with a brushing treatment of step 8 for removing from the previously treated sheet formations surface encrustations formed by the loading and electrolysis treatments and any loose particles loosened or otherwise present or formed on the sheet formations 54. To this end, the exterior of the washed sheet formation is brushed while wet with a brush having suitable bristles, such as nylon or polystyrene, dipped in ionized water. Alternatively, it may be sprayed with a forceful spray of ionized water, and such spraying may be combined with the brushing. The washed and so brushed sheet formations are then dried, for instance, air dried, in the air of an oven heated to 80° C. or lower, until dry.

For effective results, it has been found essential to limit the duration of each electrolysis activation treatment to a relatively short time, and to subject each sheet formation to repeated sequences of loading, activating, washing, brushing and drying treatments until the proper amount of active positive and negative electrode material has been deposited in the microscopic crevices or pores of the sheet formations.

By way of example, in forming sintered electrode plates .025 to .050 inch thick, good results are obtained by limiting each electrolysis activation treatment to about 15 to 25 minutes, and repeating four to five times similar sequences of loading, electrolysis-activating, washing, brushing and drying treatments for each sheet formation until it shows the proper gain of active material by decreasing the original porosity of 82 to 86% of the sintered powder body of the sheet formations to a porosity of about 45 to 65% or more specifically to about 50 to 60%.

By way of example, in each electrolizing treatment of each repeated treatment sequence, good results are obtained with the electrolysis carried on with a direct current utilizing a vessel of nickel as the anode for holding the sodium hydroxide solution constituting the electrolytic bath and carrying on the electrolysis with a current which at the start develops about one volt between the vessel and the sheet electrodes immersed in the electrolyte. In each cycle, the electrolysis is carried on for about 15 to 25 minutes until the voltage between the vessel and the immersed sheet formation increases to about 1.8 to 2 volts.

By way of example, for sheet formations having electrode plate sections 4½ inches square and .025 inch thick, each electrode section had a weight of about 72 grams before being subjected to the series of loading and activating sequences of the type described above. After completing four sequences of loading and activating treatments carried out in the manner described above, the properly activated positive plate section showed a weight gain of 6.5 to 7.5 grams, and each properly activated negative plate section showed a weight gain of 11.5 to 14 grams. With the originally sintered plates having a porosity of 85%, the repeated sequences of activating treatments reduce thus the porosity of the activated plates to about 50 to 60% or give a weight gain of about 1.5 to 1.7 grams per square inch for the positive plates and a weight gain of about 2.6 to 3.2 grams for the negative plates.

In the next treatment step 10, the properly electrolyzed and sized sheet formations are subjected to series of electric charging and discharging cycles, whereby they are properly formed. To this end, arrays of alternate positive and negative sheet formations are placed adjacent to each other within an electrolyte bath of a potassium hydroxide solution with electrolyte pervious insulating separators interposed between adjacent opposite polarity sheet formations, whereupon they are subjected to a series of electric charging and discharging cycles. By way of example, with sheet formations .025 inch thick, good results are obtained if they are formed with the following series of three forming cycles:

A first charging period of 30 hours at .045 ampere per square inch followed by a discharge at .065 ampere per square inch until the voltage per cell drops to 1 volt; followed by A second charging period of 10 hours at .065 ampere per square inch followed by the same discharge as in the first cycle; followed by A third and final charging period of 7 hours at the same rate as in the second cycle followed by the same discharge.

The sintered nickel powder sheet formations produced by the 1st sintering step described hereinbefore, gives sintered powder particle sheets of nickel varying in thickness by about ±10%. In addition, the series of loading, activating and forming treatments, including the repeated loading and electrolyzing sequences of the type described above, results in a growth of the thickness of the treated sheet formations.

On the other hand, it is desirable that battery electrode assemblies of opposite polarity having a required number of electrode plates, should be generally of the same thickness. For this reason, it is important that the individual electrode plate sheets, at least each group of electrode sheets of the same polarity, should likewise be of substantially the same thickness.

In accordance with a phase of the invention disclosed herein, all electrode plates of the same polarity are given substantially the same thickness by subjecting them, in the next treatment step 9, to a thickness sizing operation. In this sizing treatment, each properly loaded and activated sheet formation which has excessive thickness is placed while wet in a die where it is subjected to relatively high compacting pressure such as 2500 to 5000 p. s. i. (pounds per square inch) for bringing down or compacting all activated sheet formations or electrode plates of excessive thickness to substantially the same uniform thickness. This sizing treatment may be applied to the sheet formations before subjecting them to the electrolytic forming treatment by a succession of charges and discharges of the type described below.

In general, the capacity of nickel-cadmium batteries of the type described above and composed of opposite polarity electrode plates of substantially the same thickness is limited by the capacity or the active material of the positive electrode plates because a relatively larger amount of the required negative electrode material is present in each negative plate of such battery.

In accordance with the invention, the sintered nickel particle sheet formation, used for making nickel-cadmium battery plates of opposite polarity in the manner described above, are sized for thickness and the group of thicker sheet formations are segregated from the group of somewhat thinner sheet formations produced by the sintering operation; and the group or groups of the segregated thicker sheet formations are used for forming positive electrodes while the groups of segregated thinner sheet formations are used for forming the negative electrodes. After completing the activation of the groups of segregated positive thicker sheet formations and of the groups of segregated negative thinner sheet formations by the series of treatment steps described above—each of the two groups of sheet formations is subjected to a sizing treatment whereby they are brought to substantially the same thickness, with the negative battery plate formations being either of the same thickness, such as .025, or slightly thinner than the positive electrode sheet formations.

In the next treatment, step 11, the washed and sized sheet formations are stacked flat in superposed relation, under a flattening weight which presses them flat, and they are then dried in this condition. Separator sheets, of filter paper and plastic film of material such as polystyrene are placed between adjacent sheet formations. The drying is carried on at temperatures such as 80° C. or less until they reach constant weight. In this condition, they are ready to be cut into battery plate sections for assembly into batteries.

Figure 8A:
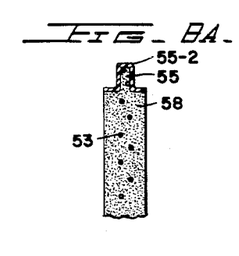
Figure 9:
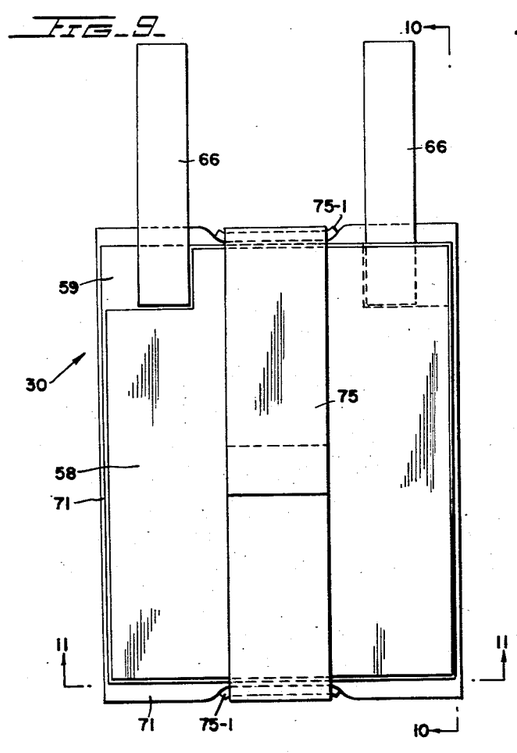
Fig. 9 is a plan view of a sub-assembly of positive and negative electrode plates and the interposed separator formations of such battery.

In the next treatment, step 12, the formed flat sheet formations are cut substantially along the center of their narrow compacted separating zones 55 into the separated individual electrode sections 58. Each electrode section 58 (Figs. 6, 8 and 8—A) has a narrow highly compacted thin edge region 55 bordering the relatively large body area of each plate section having the desired full thickness and with the pores thereof filled to the desired extent with the active positive and negative electrode materials, respectively, as described above.

In the next 13th step, the thin edges 55 of each separated plate section 58 (Figs. 7, 8) are coated or treated with a coating or cement material which binds any loose particles of the edge formation of such plate section and also provides an adherent insulating coating enclosure around any sharp ends of the wire mesh exposed by the cutting operation. By this treatment, there are avoided uncontrollable and disturbing difficulties encountered in the past resulting in unpredictable short circuits between opposite polarity electrode plates of the batteries formed of activated positive and negative electrode plates, which difficulties developed in prior art sintered plate nickel-cadmium batteries usually in the initial operation stages.

By providing each highly compacted cut edge region 55 of each electrode sheet section 58 with a cementitious insulating coating enclosure, all loose particles of such edge region are firmly bound in place. In addition, all ends and edges of cut wires of the backing mesh 53 is likewise enclosed in a protective enclosure which suppresses any tendency of such cut wire ends from penetrating a separator formation separating the edge region of one electrode from the next adjacent electrode of opposite polarity and thereby establish a short circuiting bridge therebetween.

Any alkali resistant cement or paint may be used for such edge coating. Among suitable coating materials are any of the known alkali resistant coating compounds of styrene, styrenated oils, styrenated synthetic resins which are commercially available on the market. Also, aqueous dispersions of vinyl chloride vinylidene chloride polymer, vinyl acetate powder dispersed in glycols and polyglycols and water, a polyethylene solution in aromatic hydrocarbons, and like cementitious coating material.

Fig. 8–A shows in cross-section a compacted thin edge portion 55 of an electrode plate 58 to which a thin coating layer 55-2 of such cementitious coating material has been applied to the entire periphery of such electrode plate 58. Fig. 8 shows a thick protective layer 55-1 of alkali resistant plastic material applied or secured to the thin compacted edge portion 55 of such electrode plate 58 along its entire periphery so that each electrode plate has along its compacted edge region 55 substantially the same thickness as its main electrode region bounded thereby. The thick protective layer 55-1 may be formed of suitable alkali resistant plastic or resinous film material, made in the form of a channel formation and secured to the thin edge region 55 of the electrode plate 58, either by a cement, such as cementitious coating compound of styrene, or the like, or by heat sealing the protective layer 55-1 to the underlying portions of the edge region 55. Any alkali resistant thermoplastic film material may be used for the protective layer 55-1, such as polyethylene, polyvinyl chloride and similar thermoplastic film material.

In the next 14th and last step, each electrode plate section 58 is provided with an electrode lead 66 (Fig. 8), formed of a strip of nickel sheet material affixed, as by welding, to the compacted terminal portion 59 of the electrode section 58 which has almost 100% density and permits ready and firm electric welding of a nickel electrode tab 66 thereto.

In accordance with another phase of the invention, the large multi-section sheet formations 54, such as shown in Fig. 5—after fully loading, activating and sizing in the manner described above, and before cutting them into individual electrode plate sections 58—have applied, to their compacted separation regions 55 and their edge regions 57, an electrically insulating plastic or resinous protective film formation so as to assure that when cutting the sheet formation into separate electrode sections 58 along their separation zones 55, the cut edges of each electrode sheet section 58 will be provided with an electrically insulating coating enclosure for preventing loosening of any powder particles thereof. In addition, after cutting, the edges of each so previously coated sheet edge formation are further heated or coated to assure that all ends of the wire mesh exposed along the edges by the cutting operation are covered by a film of resin or plastic material adhering and united thereto for preventing the development of a short circuiting bridge between adjacent opposite polarity electrodes of the battery.

Figure 2:
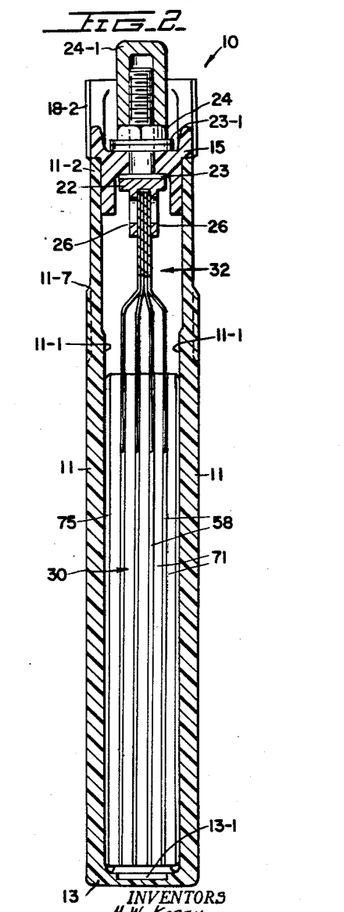
Fig. 2 is a cross-sectional view along line 2—2 of Fig. 1.
Figure 3:
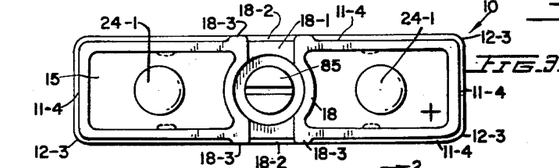
Fig. 3 is a top elevational view of the battery cell of Fig. 1.

By the series of procedures such as described above, there are thus prepared sets of positive electrode plate sections 58 and sets of negative electrode plate sections 58, each section having an electrode tab 66, suitable for assembling therefrom a battery sub-assembly such as shown at 30 in Figs. 1 to 3.

In such plate sub-assemblies, the alternate electrode plates 58 of opposite polarity must be separated from each other in a reliable manner by an insulating separator which permits substantially unimpeded electrolytic conduction through the liquid electrolyte placed between adjacent plates while suppressing the possibility of the development of any formations which tend to form a short circuiting bridge between adjacent electrode plate portions of opposite polarity, or in general, preventing the possibility of any partial or full short circuit between them.

According to a phase of the invention disclosed herein, an effective separator for such battery electrode plates is provided by a continuous thin electrolysis pervious film with the film backed on its opposite sides with a fabric layer of alkali resistant threads or filaments.

Figure 10:
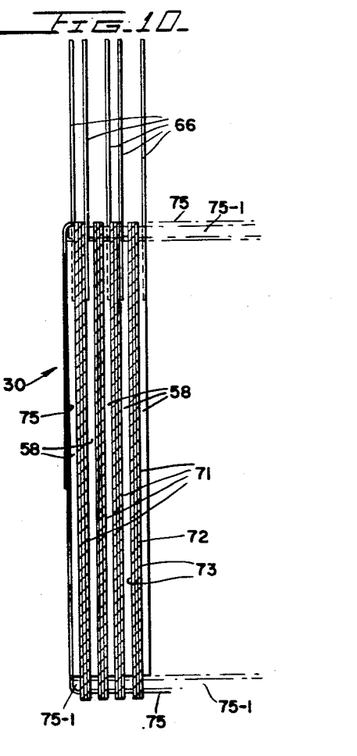
Fig. 10 is a cross-sectional view along line 10—10 of Fig. 9 with some of the parts shown exaggerated for the sake of clarity.
Figure 11:
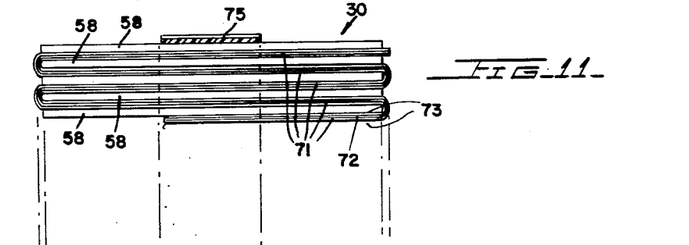
Fig. 11 is a cross-sectional view along line 11—11 of Fig. 9, with some of the parts shown exaggerated.
Figure 11A:
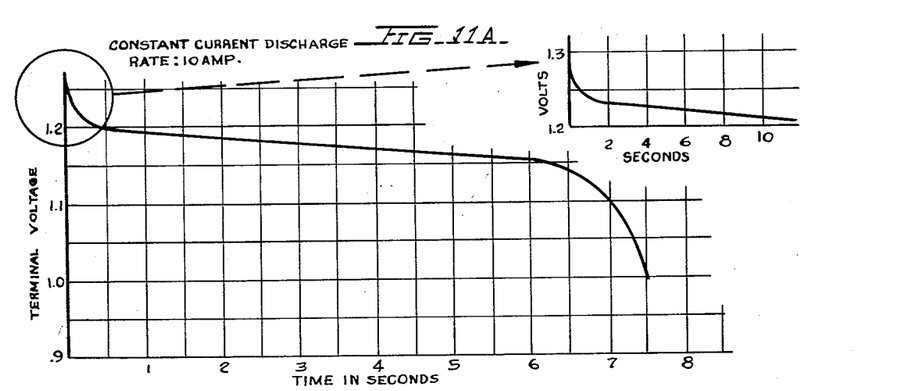
Figure 11B:
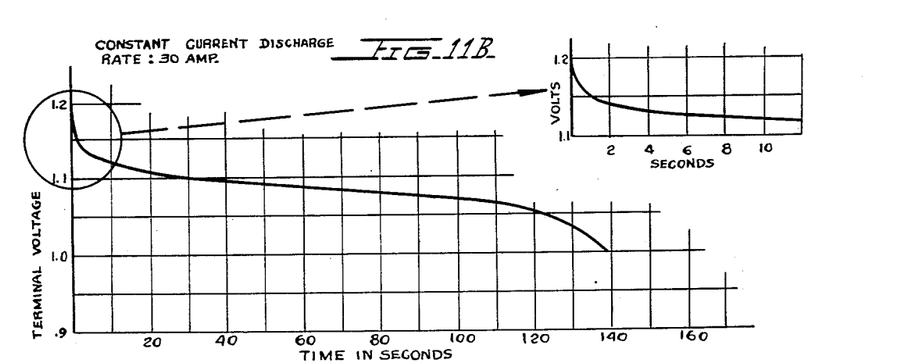
Figure 11C:
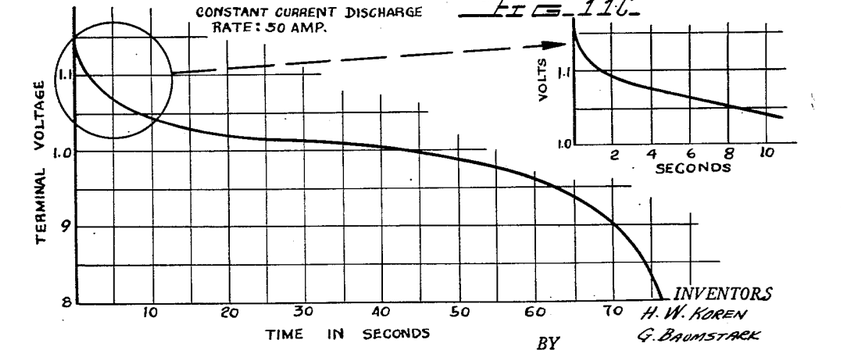

Referring to Figs. 10 and 11, the battery assembly 30 has adjacent battery electrode plates 58 of opposite polarity separated by adjacent sections 71 of a separator formation of the invention. The separator formation 71 consists of a central film 72 backed on opposite sides by a layer of fabric 73. Suitable materials for the electrolysis pervious separator film 72 are films of regenerated cellulose (cellophane) without plasticizer, and similar films of regenerated nitro-cellulose and of organic esters and ethers of cellulose which may be partially saponified, such as cellulose acetate and ethyl cellulose and also films of vinyl alcohol polymer, all without plasticizer. Also, microporous films which are resistant to alkali solutions and permit electrolytic action through the pores, such as films produced by forming a film out of polyvinyl chloride dispersed and/or dissolved in a solvent and having admixed thereto dissolvable additions, such as starch or dextrin, and after driving off the solvent, the starch or dextrin additions thereof are removed, for instance, by a treatment with sulfuric acid solution at 90 to 100° C. or by such sulfuric acid treatment preceded by a treatment with a caustic alkali.

Any of the known alkali resistant fibrous or filamentary materials may be used for the backing fabric layers 73 on the opposite sides of the continuous film layer 72 of the separator 71. Among suitable fiber or filament materials for such backing fabric layers 73 are the nylons, polyethylene terephthalate (Dacron), acrylonitrile, polystyrene, vinylidene chloride, vinyl chloride, polyvinyl chloride and the like.

As seen in Figs. 1 and 2, the battery top or cover wall 15 of the battery cell is relatively rigid and is provided with a generally rectangular border portion 16 arranged to fit within the interior of the adjoining end of the battery cell casing 11–0. The interfitting surfaces of the top wall 15 and cell casing walls 11–0 are hermetically joined to each other as by a suitable alkali resistant cement, such as cementitious compounds of styrene, styrenated oils, styrenated synthetic resins which are commercially available on the market. Alternatively, the the interfitting walls may be affixed to each other by heat sealing.

The electrolyte within the interior of the cell casing 11–1 is maintained at a level of about ¼ to ½ inch above the upper level of the electrode plates of the electrode assembly 30 positioned in the inner part of the battery cell casing 11–2.

The top wall 15 of the battery is also provided with a venting and filling structure to permit gases evolved in the interior of the cell casing 11–2 to be discharged before they develop excessive pressure and also to permit replenishing of the electrolyte within the cell casing.

Figure 1A:
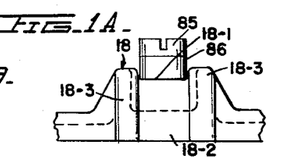

In the form shown, the top wall of the battery casing has at its center a vent and filling opening 17. The top wall opening 17 is shown closed by a closure member 81 of alkaline resistant metal, to wit, nickel, having at its lower end a threaded portion 82 arranged to threadedly engage the threaded wall surface of the top wall opening 17. The closure member 81 is shown provided with an intermediate sealing flange 83 arranged to overly and clamp an underlying sealing washer 84, of neoprene, for instance, by means of which the closure member seals off the top wall opening 17 when the closure member is in its sealing position (Figs. 1, 1–A, 2). The outer end of the closure member 81 is provided with a head 85 having on its exterior a slit so that its threaded inner end 82 may be readily screwed in and out, as by a screw driver, from its threaded engagement with the threaded top wall hole 17.

The outer part of the closure member 81 has an outer head 85 and intermediate closure flange 83 which is enclosed with a tubular sealing sleeve member 86 of yieldable elastic rubber-like material such as neoprene. The closure member 81 is provided with a downwardly extending axial vent passage or bore 87 having at its top a lateral outlet opening 88 which is normally maintained sealed by the elastic pressure of the sealing sleeve 86. The vent passage 87 and its sealing sleeve 86 are so designed that under excessive gas pressure developed in the interior of the sealed cell casing 11–0, the gases will lift the sealing sleeve 86 from the vent outlet opening 88 and permit gases to escape therethrough.

The top wall 15 is provided with an upwardly extending central tubular wall portion 18 of the top wall 15 surrounding the outer part of the closure member 18 and serving as a well or retainer structure for retaining electrolyte discharged through the vent opening passages 87, 88 with the gases expelled therethrough.

The vent opening region 17 of the top wall 15 is also provided with an inwardly extending tubular spray baffle structure 19 for suppressing spraying of electrolyte into the top wall opening 17 by gases evolved during the charging operation. In the form shown, the tubular spray baffle 19 terminates at its lower end slightly above the upper edge of the battery plate assembly 30 and serves as a stop against outward movement of the battery assembly when it is accelerated by impact forces from its inward position towards the top wall 15.

The lower edge of the tubular spray baffle wall 19 of the top wall 15 terminates below the level 41 of the electrolyte within the battery cell casing, thereby sealing off the lower edge of the tubular spray baffle 19 against direct entry of sprayed electrolyte, since the lower inner edge of the tubular baffle spray 19 overlies the region of the battery assembly 30 which is enclosed at the top by the fastening strip 75 and also the yoke member 75–1.

Gases evolved between the adjacent electrode plates 58 of the battery assembly will thus be discharged into the upper space of the battery compartment outside the space enclosed within the spray baffle 19 and any electrolyte sprayed by such gases in upward direction will be deflected by the tubular baffle 19 away from the top wall opening 17.

The gases so discharged into the upper space of the battery casing 11–0 surrounding the tubular spray baffle 19 may flow therefrom through lateral openings 89 provided in the upper part of tubular baffle walls 19 so that the gases may pass therethrough and be discharged by way of the vent passage 87 of the sealing member 81 to the exterior of the battery cell casing 11–0.

The outer electrolyte retaining wall 18 of the top wall 15—which surrounds the vent opening 84—is provided along side wall portions of its upper border with outlet or spout recesses 18–1 for permitting electrolyte entering the well space to overflow downwardly toward the outer surfaces of the side walls 11 of the battery casing 11–0. In order to limit the flow of the electrolyte leaving the lateral spout recesses 18–1 of the tubular well wall 18, its outer side walls are shaped to provide a deflecting channel 80–2 which confines the outflowing electrolyte to a downwardly flowing direction and suppresses leakage of electrolyte toward the surrounding top surface portions of the top wall 15 of the battery.

Batteries of the invention of the type described above are characterized by very high discharge capacity under short circuit conditions and will operate during a very long, useful life under a variety of adverse conditions which would impair the operation of other batteries. By way of example, and without thereby limiting the scope of the invention, there are given in Figs. 11–A, 11–B, and 11–C, curves showing typical discharge characteristics of one form of a battery based on the principles of the invention. The specific battery had 8 positive electrode plates and 7 negative electrode plates each plate being 1 inch wide, 2¼ inch long and .025 inch thick. Fig. 11–A shows the discharge conditions of such battery cell for a constant current discharge of 10 amperes, the discharge conditions during the first ten seconds being shown on an enlarged scale in an auxiliary curve portion to the right of Fig. 11. Fig. 11–B and Fig. 11–C show corresponding discharge characteristics for discharges with a constant current at the rate of 30 amperes and 50 amperes, respectively.

In addition each of the outer regions of the top wall 15, adjoining the two terminal members 21, is provided with an upwardly projecting border ridge 15–3 which forms around each outwardly projecting terminal member 21, a raised border wall 15–3 which suppresses flow or creepage of liquid or electrolyte spilled on such top wall region to an adjacent top wall region of another terminal member 21 of the same or an adjoining battery cell.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

We claim:

1. In the process of producing electrode plates for alkaline storage battery cells out of self-supporting sheet formations, each comprising a porous layer of sintered nickel powder particles, the steps comprising providing a sheet formation containing a supporting member having on at least one side thereof a porous layer of sintered powder particles of a metal selected from the group consisting of nickel and iron, compacting said sheet formation along narrow separation zones to change said separation zones to zones of low porosity having a thickness of at most half the original thickness thereof, said separation zones separating said sheet formation into several sections of areas corresponding to the areas of the several desired electrode plates, subjecting the integral sheet formation to treatments wherein the pores of the several sheet sections are loaded with desired active electrode material which is modified when charging or discharging a cell thereafter subjecting said sheet formation to at least one electric charging and discharging cycle while immersed in an electrolyte and thereafter cutting the so treated sheet formations along said separation zones to provide individual electrode plates loaded with at least partially electroformed active electrode material.

2. In the process of producing electrode plates for alkaline storage battery cells out of self-supporting sheet formations, each comprising a porous layer of sintered nickel powder particles, the steps comprising providing a sheet formation containing a supporting member having on at least one side thereof a porous layer of sintered powder particles of a metal selected from the group consisting of nickel and iron, compacting said sheet formation along narrow separation zones to change said separation zones to zones of low porosity having a thickness of at most half the original thickness thereof, said separation zones separating said sheet formation into several sections of areas corresponding to the areas of the several desired electrode plates, subjecting the integral sheet formation to treatments wherein the pores of the several sheet sections are loaded with desired active electrode material which is modified when charging or discharging a cell, assembling so treated different sheet formations loaded with positive and negative active material respectively in side by side relation to form a temporary cell assembly and subjecting said cell assembly to at least one electric charging and discharging cycle while immersed in an electrolyte bath and thereafter cutting the so treated sheet formations along said separation zones to provide individual electrode plates loaded with at least partially electroformed active electrode material.

3. In the process as claimed in claim 1, said treatments which precede the cutting operation also including subjecting the integral sheet formation to a cathodic electrolyzing treatment.

4. In the process as claimed in claim 1, said treatments which precede the cutting operation also including subjecting the integral sheet formation to a cathodic electrolyzing treatment, assembling so treated different sheet formations loaded with positive and negative active material respectively in side by side relation to form a temporary cell assembly and subjecting said cell assembly to at least one electric charging and discharging cycle while immersed in an electrolyte bath.

5. In the process as claimed in claim 1, said treatments which precede the cutting operation also including repeated impregnation of the pores of the sheet formations with a potentially active compound and thereafter subjecting the sheet formations to a cathodic electrolyzing treatment after each impregnating treatment.

6. In the process as claimed in claim 1, said treatments which precede the cutting operation also including repeated impregnation of the pores of the sheet formations with a potentially active compound and thereafter subjecting the sheet formations to a cathodic electrolyzing treatment after each impregnating treatment, assembling so treated different sheet formations loaded with positive and negative active material respectively in side by side relation to form a temporary cell assembly and subjecting said cell assembly to at least one electric charging and discharging cycle while immersed in an electrolyte bath.

7. In the process as claimed in claim 6, said treatments which precede the cutting operation also including washing the sheet formations after each cathodic electrolyzing process applied thereto.

8. In the process as claimed in claim 6, said treatments which precede the cutting operation also including washing said sheet formations after each cathodic electrolyzing treatment and after washing and while wet, subjecting said sheet formations to a sizing treatment wherein excessively thick sheet formations are compacted to a predetermined thickness.

9. In the process as claimed in claim 2, said treatments which precede the cutting operation also including washing said sheet formations after each cathodic electrolyzing treatment and after washing and while wet, subjecting said sheet formations to a sizing treatment wherein excessively thick sheet formations are compacted to a predetermined thickness.

10. In the process of producing electrode plates for alkaline storage battery cells out of self-supporting sheet formations, each comprising a porous layer of sintered nickel powder particles, the steps comprising providing a sheet formation containing a thin reticulated supporting member having on at least one side thereof a porous layer of sintered powder particles selected from the group consisting of nickel and iron, compacting said sheet formation along a plurality of separation zones to change said separation zones to zones of low porosity having a thickness of at most half the original thickness thereof, said separation zones including a plurality of narrow intersecting linear zones extending to opposite borders of said sheet and at least one zone of increased width at at least one intersection of said intersecting linear zones whereby said separation zones separate said sheet formation into several sections of areas corresponding to the areas of the several desired electrode plates and whereby the separation zones of increased width at the intersections provide means for attaching an electrode tab to the plate, subjecting the integral sheet formation to treatments wherein the pores of the several sheet sections are loaded with desired active electrode material which is modified when charging or discharging a cell thereafter subjecting said sheet formation to at least one electric charging and discharging cycle while immersed in an electrolyte and thereafter cutting the so treated sheet formations along said separation zones to provide individual electrode plates loaded with at least partially electroformed active electrode material.

11. In the process of producing electrode plates for alkaline storage battery cells out of self-supporting sheet formations, each comprising a porous layer of sintered nickel powder particles, the steps comprising providing a sheet formation containing an embedded supporting member having on at least one side thereof a porous layer of sintered powder particles selected from the group consisting of nickel and iron, compacting said sheet formation from both sides towards said embedded supporting member along a plurality of narrow separation zones, to change said separation zones to zones of low porosity having a thickness of at most half the original thickness thereof, said separation zones separating said sheet formation into several sections of areas corresponding to the areas of the several desired electrode plates, subjecting the integral sheet formation to treatments wherein the pores of the several sheet sections are loaded with desired active electrode material which is modified when charging or discharging a cell thereafter subjecting said formation to at least one electric charging and discharging cycle while immersed in an electrolyte and thereafter cutting the so treated sheet formations along said separation zones to provide individual electrode plates loaded with at least partially electroformed active electrode material.

References Cited in the file of this patent

UNITED STATES PATENTS

| | | |
|---|---|---|
| 2,254,286 | Hauel | Sept. 2, 1941 |
| 2,361,378 | Brennan | Oct. 31, 1944 |
| 2,366,402 | Hauel | Jan. 2, 1945 |
| 2,544,112 | Schneider | Mar. 6, 1951 |